United States Patent
Conway

(10) Patent No.: US 8,582,706 B2
(45) Date of Patent: Nov. 12, 2013

(54) TRAINING A DATA PATH FOR PARALLEL DATA TRANSFER

(75) Inventor: Craig M. Conway, Leander, TX (US)

(73) Assignee: National Instruments Corporation, Austin, TX (US)

( * ) Notice: Subject to any disclaimer, the term of this patent is extended or adjusted under 35 U.S.C. 154(b) by 887 days.

(21) Appl. No.: 12/608,042

(22) Filed: Oct. 29, 2009

(65) Prior Publication Data

US 2011/0103533 A1 May 5, 2011

(51) Int. Cl.
*H04L 7/00* (2006.01)

(52) U.S. Cl.
USPC .......................................... 375/354

(58) Field of Classification Search
USPC .................. 375/354, 316, 356, 371, 373, 375
See application file for complete search history.

(56) References Cited

U.S. PATENT DOCUMENTS

| | | | |
|---|---|---|---|
| 4,814,879 A | | 3/1989 | McNeely et al. |
| 5,008,904 A | * | 4/1991 | Mangelsdorf et al. ........ 375/356 |
| 5,467,464 A | | 11/1995 | Oprescu et al. |
| 5,533,072 A | | 7/1996 | Georgiou et al. |
| 5,594,762 A | | 1/1997 | Joo et al. |
| 5,920,704 A | | 7/1999 | Olnowich et al. |
| 6,834,255 B2 | | 12/2004 | Abrosimov et al. |
| 7,089,440 B2 | | 8/2006 | Wu |
| 7,130,367 B1 | | 10/2006 | Fu et al. |
| 7,295,641 B1 | | 11/2007 | Wortman et al. |
| 2002/0006177 A1 | * | 1/2002 | Pickering et al. ............. 375/371 |
| 2002/0140461 A1 | | 10/2002 | Enam et al. |
| 2003/0046618 A1 | * | 3/2003 | Collins ......................... 714/700 |

OTHER PUBLICATIONS

"ALTLVDS Megafunction User Guide"; Altera Corporation; Nov. 2009; 78 pages.

Ralf Krueger; "SERDES Framer Interface Level 5—XAPP871"; XILINX; Feb. 28, 2008; 35 pages.

* cited by examiner

*Primary Examiner* — Kevin M Burd

(74) *Attorney, Agent, or Firm* — Meyertons Hood Kivlin Kowert & Goetzel, P.C.; Jeffrey C. Hood

(57) ABSTRACT

A system and method for training a data path for parallel data transfer are presented. A first part of the method includes determining a delay setting for each coupling of a plurality of parallel couplings between a first device and a second device. The delay setting for each coupling may substantially align reception of signals transmitted from the first device to the second device on each coupling with a system clock. A second part of the method includes determining the alignment of the plurality of parallel couplings relative to each other. A timing adjustment for one or more of the plurality of parallel couplings may then be determined, whereby after the timing adjustment, signals transmitted from the first device to the second device on the plurality of couplings are received by the second device in alignment with each other.

12 Claims, 2 Drawing Sheets

TRAINING A DATA PATH FOR PARALLEL DATA TRANSFER

FIELD OF THE INVENTION

The present invention relates to parallel communication and more particularly to a system and method for training a data path for parallel data transfer.

DESCRIPTION OF THE RELATED ART

Parallel communication involves communicating data signals over multiple parallel channels simultaneously. Properly coordinated with a system clock, an n-bit parallel communication link may be able to send an n-bit word every clock cycle (or twice every clock cycle in double data rate communication). Thus, in theory, an n-bit parallel communication channel would transfer data n times faster than a serial communication channel operating according to the same system clock. However, parallel communication is susceptible to certain issues that need to be resolved in order to ensure that each transmitted word is faithfully received.

One such issue, which is not necessarily limited to parallel communication, is metastability. That is, if the data being received on a given data channel is changing too near a clock edge (i.e., when the clock is switching from high-to-low or vice versa), this may cause a setup or hold violation, leading to metastability and possibly to incoherent or improperly received data. Thus, it is important to align each data channel with the system clock.

Another potential problem involves the relative timing of the data channels. Parallel data channels may have different physical properties (e.g., wire-interconnect length, temperature variations, material imperfections, etc.), and hence data sent on each individual data channel may have a different transit time. It is possible, then, that one or more bits of a word transmitted at a given clock signal might be received at a different clock signal than the other bits of the word. Thus, it is important to align the data channels with each other.

Thus, improvements in the field of parallel communication are desired.

SUMMARY OF THE INVENTION

Various embodiments are presented of a system and method for training a data path (e.g., a parallel data bus, including a plurality of parallel couplings) for parallel data transfer. The method for training a data path for parallel data transfer may include 1) removing metastability on the individual couplings (also referred to herein as data channels or data lines) of the parallel data path and 2) aligning the data channels with each other. A set of embodiments is presented below for each method. It should be noted that although the embodiments of the two methods described below may ideally be implemented together, each part may alternatively be implemented with a different implementation of the other part than is described herein. In other words, if desired, an embodiment of the method for removing metastability on the individual couplings described below may be used with a method for aligning the couplings with each other which is not described herein, while a method for removing metastability on the individual couplings which is not described herein may be used with an embodiment of the method for aligning the couplings with each other described below.

The method may be implemented by logic, (e.g., analog or digital logic, such as an application specific integrated circuit (ASIC), a programmable hardware element such as an FPGA, a processor executing program instructions for training a data path for parallel data transfer from a memory medium, including an embedded microprocessor or a microcontroller, or any combination of different types of logic) as part of a system including a first device coupled to a second device by a plurality of parallel couplings. The logic may be coupled to the first device and the second device; the system may also include a clock that provides clock signals to each device in the system.

The first method for training a data path for parallel data transfer may include removing metastability on the individual data channels of the parallel data path. In other words, each coupling of the plurality of couplings that make up the parallel data path may need to be aligned with the system clock such that signals received by the second device on the respective coupling are captured cleanly by the second device.

The first device may be instructed (e.g., by the logic) to send a plurality of first signals to the second device on one of the plurality of parallel couplings between the first device and the second device. Each first signal may be a particular pattern which matches the signals of the system clock. For example, each first signal may include a certain number of bits (e.g., 2, 4, 8, or any other number), where each bit matches the signal (e.g., high or low) of the system clock at the time that bit is transmitted by the first device. Alternatively, each first signal may be designated as an amount of time (e.g., 1 ms) during which each clock signal (e.g., high or low) is matched by a corresponding (e.g., high or low) transmitted bit.

The second device may be instructed (e.g., by the logic) to delay reception of each first signal of the plurality of first signals by each of a plurality of delay settings. The possible delay settings may range from no delay to a full clock cycle (or more); in some embodiments, it may only be necessary that the delay settings range up to some significant fraction of a clock cycle. The possible delay settings may include incremental increases between a minimum and a maximum possible delay. The second device may receive a first signal at a first delay setting, then receive another first signal at a second delay setting, then another first signal at a third delay setting, and so on for each delay setting. The second device may store the first signals received according to each delay setting in a memory, such as registers in the second device, or another type of memory. The received first signals may be stored in the memory according to the clock signals during which they are received. For example, the memory may have locations (e.g., flip-flops) designated for bits received during rising edge clock signals as well as locations designated for bits received during falling edge clock signals.

The received first signals may be read (e.g., by the logic) from the memory. The logic may determine an appropriate delay setting for the coupling between the first device and the second device based on reading the first signals received at each respective delay setting. In other words, because each bit of the received first signals is stored according to the clock cycle during which it is received, and each bit value corresponds to a falling or rising edge of the clock cycle during which it was transmitted, the logic may be able to determine whether the first signal received at a given delay setting was cleanly (i.e., without setup or hold violations) received by the second device. Furthermore, by comparing the stored values of the received first signals at each delay setting, the logic may be able to determine one or more stable regions, that is, regions (i.e., two or more consecutive delay settings) for which the data was received cleanly. In one embodiment, the best delay setting (that is, the delay setting at which data is received most closely aligned with the clock signals) may be the delay setting in the middle of the largest region of cleanly received data. It will be noted that a stable region, though aligned with the system clock, may not be in phase with the system clock; for example, each bit transmitted on a falling edge may be received on a rising edge, and vice versa. In a case where the determined delay setting falls in one of these regions, the logic may instruct the second device to store signals received on the coupling as if the signals are received in the opposite phase of the clock cycle of the system clock. For example, if the second device uses falling- and rising-edge flip-flops to store the data, the logic may set a register bit in the second device to reverse these designations, such that bits received on a falling edge are stored in a rising-edge flip-flop, and vice versa, for the coupling.

Thus, a signal transmitted from the first device to the second device on the coupling which is received by the second device according to the determined delay setting may be substantially aligned with the system clock. The first part of the method, as described above, may be performed for each coupling of the plurality of parallel couplings that make up the parallel data path.

The second method for training a data path for parallel data transfer may include aligning the data channels with each other. In other words, it may be important to ensure that bits which are transmitted in the same clock cycle by the first device are received in the same clock cycle by the second device. Another way of saying this is that a word which is transmitted by the first device should be faithfully reproduced at the second device. The method described below may accomplish this.

The first device may be instructed (e.g., by the logic) to send a signal on each of the plurality of couplings between the first device and the second device. Each signal may be an identical pattern. The pattern may be a sparse and repeating pattern, such that the word pattern produced by transmitting the pattern on the parallel data path (i.e., including all of the couplings) may be similarly distinct and usable in determining the relative alignment of the couplings to each other. The second device may receive and store the signals in a memory. The signals may be stored as words, e.g., a set of bits received in a given clock cycle may be stored together as a word. Considered another way, the received signals may be stored by the second device according to the clock signal during which the signals are received.

The logic may read the stored signals (e.g., the stored words) from the memory. Based on the pattern according to which the logic instructed the first device to send signals, the logic may know what word pattern would indicate that the plurality of couplings are aligned with each other, and accordingly may be able to determine what any deviations from that expected word pattern mean in terms of the relative alignment of the plurality of couplings. In other words, the logic may determine the relative alignment of the signals received on each of the plurality of couplings based on reading the signals received by the second device and stored as words. Thus, if the signals received on any of the couplings are not correctly aligned with the signals received on any other of the couplings, the logic may determine a timing adjustment for one or more of the couplings. For example, the timing adjustment may be a delay at which signals on a given coupling are received by the second device. This delay may be an integer multiple of the clock cycle of the system clock; in other words, each coupling may be delayed by one clock cycle two clock cycles, or some other integer multiple of the clock cycles of the system clock.

The timing adjustment(s), if any, may be implemented in the second device for the appropriate coupling(s). For example, the logic may configure the second device to implement the determined timing adjustments for signals received on the appropriate couplings. After the timing adjustments are implemented, a word transmitted by the first device to the second device on the plurality of couplings may be faithfully received and stored by the second device.

BRIEF DESCRIPTION OF THE DRAWINGS

A better understanding of the present invention can be obtained when the following detailed description of the preferred embodiment is considered in conjunction with the following drawings, in which.

Figure 1:
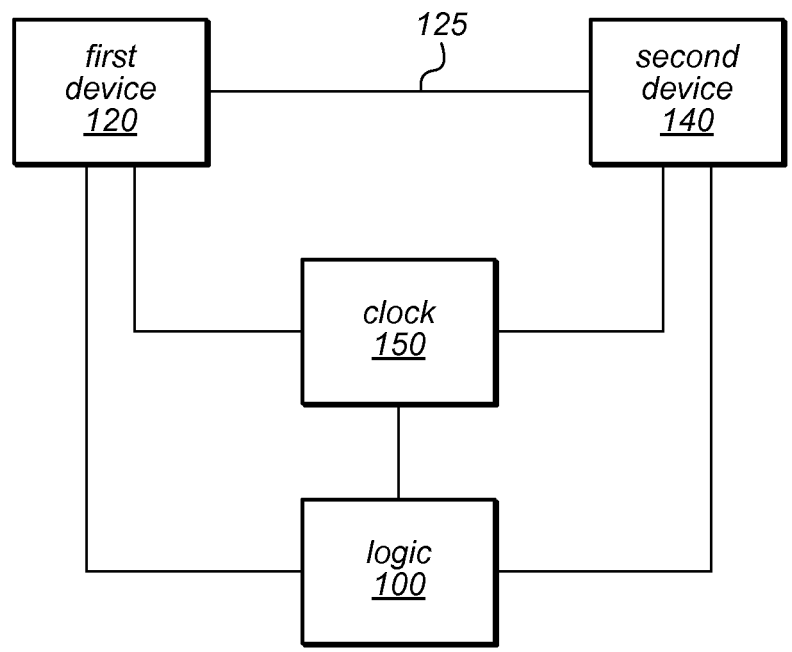
FIG. 1 is an illustration of an exemplary system including a first device and a second device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—System with Two Devices

FIG. 1 illustrates an exemplary system including a first device 120 and a second device 140. The first device 120 and the second device 140 may be part of a system, e.g., part of a computer system, or any kind of system. For example, in one embodiment, the first device 120 and the second device 140 may be programmable hardware elements (such as FPGAs) on a card-based device, e.g., on a printed circuit board (PCB). Alternatively, or considered another way, the first device 120 and the second device 140 may be components of a computer system. The computer system may be any kind of computer system, e.g., a home computer system, or a specialized computer system such as a testing or measurement system. In one embodiment the system may be a digitizer. The first device 120 and the second device 140 may be coupled together with a parallel communication bus 125, e.g., plurality of parallel couplings; for example, in one embodiment, the first and second devices may be coupled together with a 128 bit low-voltage differential signaling (LVDS) communication bus. The communication bus 125 may be a double data rate (DDR) communication bus; in other words, signals may be transmitted and received both on the rising edge and the falling edge of each clock cycle. Alternatively, the first and second devices may be coupled with any parallel means of communication including a plurality of parallel couplings. The system may include a system clock 150 for synchronizing the elements of the system. The system may have more than one clock, however, at least in one embodiment, it may not be necessary that the system include more than one clock.

In order for the first device 120 to communicate with the second device 140 on the plurality of parallel couplings 125, the data path may need to be trained. In other words, it may be important to ensure that signals sent on each of the couplings 125 are received without metastability, and that the signals sent on the plurality of couplings 125 are properly coordinated such that a word transmitted from the first device 120 on the plurality of couplings 125 is faithfully reproduced at the second device 140. In one embodiment, some form of logic 100 may be coupled to the first device and the second device to train the data path. The logic 100 may be any of various kinds of logic, including analog or digital logic. Some exemplary implementations of the logic 100 could include a processor executing program instructions from a memory medium, an application specific integrated circuit (ASIC), a programmable hardware element such as an FPGA, dedicated hardware such as a microprocessor or microcontroller, or any combination of different types of logic. The logic 100 may be a permanent part of the system, e.g., logic embedded on a PCB with the first device and the second device, or may be temporarily coupled to the system, e.g., specifically to train the data path between the first device and the second device. The logic 100 may be configured to perform one or both of the methods described below with respect to FIGS. 2 and 3 according to various embodiments.

Figure 2:
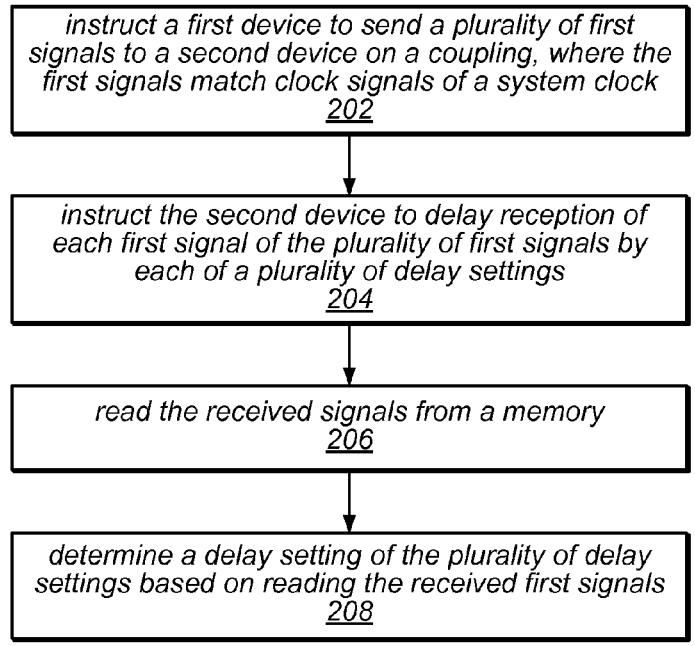
FIG. 2 is a flowchart diagram illustrating a method for removing metastability on a coupling according to one embodiment.

FIG. 2—Method for Removing Metastability in Signals Received on a Coupling

FIG. 2 is a flowchart diagram illustrating a method for removing metastability in signals received on a coupling according to one embodiment. The method may be performed by logic coupled to a first device and a second device, such as in the system described above with respect to FIG. 1 according to various embodiments, e.g., to remove metastability in one or more couplings of a plurality of parallel couplings between two devices. Alternatively, the method may be performed to remove metastability on a single coupling between two devices.

In 202, a first device may be instructed to send a plurality of first signals to a second device on a coupling, where the first signals match clock signals of a system clock. The instructions may be provided to the first device by the logic. Thus, when the clock at the first (transmitting) device is high or low (e.g., in a double data rate system), each data bit transmitted may also be high or low. Alternatively, the transmitted bits may be the opposite of the clock signal at the transmitter, e.g., a low bit (e.g., 0) may be transmitted during a high clock cycle while a high bit (e.g., 1) may be transmitted during a low clock cycle. In general, the instructions may cause the first device to match the first signals to the clock signals of the system clock in such a way that it may be determined (e.g., upon receipt of the data) during what clock cycle (e.g., high or low) a data bit was transmitted based on the value of the data bit.

In 204, the second device may be instructed to delay reception of each first signal of the plurality of first signals by each of a plurality of delay settings. The instructions may be provided to the second device by the logic. The second device may be configurable with a plurality of possible delay settings. For example, in one embodiment, the second device may be an FPGA configurable with 16 delay settings in increments of 50 ps. Thus in this example, reception of the first signals by the second device could be delayed for 0 ps, 750 ps, or any 50 ps increment in between. It should be noted that this number of delay settings and incrementing scheme are exemplary only; other numbers of delay settings and increments of delay settings are also envisioned, e.g., 10 ps increments, 100 ps increments, continuous increments, etc. In many embodiments, the range of delay settings may provide the possibility of delaying the received signals by up to a substantial portion of a clock cycle, e.g., ½, ⅔, ¾, or a full clock cycle. With such a range of delay settings, it may be guaranteed that an optimal delay setting (e.g., a delay setting at which signals are received most nearly in alignment with the clock signals) is possible.

The second device may, based on the instructions, receive the first signals for a period of time (e.g., several microseconds, or some other period of time) at each delay setting. In other words, the second device may receive a series of bits at a first delay setting, then adjust the delay setting to a second delay setting and receive another series of bits. This may be done for each delay setting, or for a subset of possible delay settings.

The received data bits may be stored in a memory by the second device. In one embodiment, the second device may have DDR input flip-flops to accept the data. In this case, there may be an output corresponding to a flip-flop capturing the data on the rising edge of a clock cycle and an output corresponding to a flip-flop capturing the data on the falling edge of a clock cycle. As an example, the second device may be configured (e.g., by the logic 100 shown in FIG. 1) to capture the state of the rising- and falling-edge signals over a period of several microseconds, recording the values received during the rising and falling edges. In the example above, where the first signals match the clock signals (e.g., 1s on rising edges and 0s on falling edges), cleanly received data would correspond to the rising edge output always returning 1s and the falling edge output always returning 0s.

In 206, the received first signals may be read from a memory. In one exemplary embodiment, a 4-bit vector may be recorded for each delay setting. The 4-bit vector may record, over some time period, whether a 1 or 0 was received by the rising-edge flip-flop and whether a 1 or 0 was received by the falling-edge flip-flop. By reading the 4-bit status word for each delay setting, it may be clear which delay settings captured the data cleanly, and which did not. For example, a value of 0x9 (0b1001) may indicate that the rising edge always returned 1 and the falling edge always returned 0, so the data was received without any uncertainty. A value of 0x6 (0b0110) may also indicate that the rising edge and the falling edge were stable, but that the rising edge was always 0 and falling edge was always 1. This may imply that the data bit is delayed relative to the clock by half of a clock period. Any other value may indicate that the rising edge or the falling edge received both ones and zeroes, so the setup/hold of the receiving flip-flop may have been violated. For example, a value of 0xE (0b1110) might mean that the rising edge received both ones and zeroes, while the falling edge only received ones. Following the examples given above, a test using 16 delay settings might return the following exemplary results:

| 0  | 1001 |
|----|----------|
| 1  | 1001 |
| 2  | 1001 |
| 3  | 1110     |
| 4  | 1111     |
| 5  | 1111     |
| 6  | 1101     |
| 7  | 0110 |
| 8  | 0110 |
| 9  | 0110 |
| 10 | 0110 |
| 11 | 0110 ← best setting |
| 12 | 0110 |
| 13 | 0110 |
| 14 | 0110 |
| 15 | 0111     |

The bold settings indicate that data was captured without metastability for those settings. It will be noted that the data is stable and in phase with the clock for delays 0, 1, and 2. It is also stable for delays 7-14, but out of phase with the clock.

In 208, a delay setting of the plurality of delay settings may be determined based on reading the received first signals. For example, it may be determined that delay setting 11 is the best choice, even though it is out of phase with the clock, as it may provide the most margin, i.e., it is the setting in the middle of the largest stable region. In this example, delay setting 10 might alternatively be determined as the best choice, as it is also in the middle of the largest stable region. In other words, the determined delay setting may be the delay setting of the tested delay settings which is closest to being in alignment with the clock. However, in some embodiments (such as in this example, where the determined delay setting is out of phase with the system clock), the second device may be instructed (e.g., by the logic) to store signals received on this particular coupling as if they are received in the opposite phase of the clock cycle of the system clock. For example, a register in the second device may be set to swap the rising edge and falling edge input flip-flops for this coupling. On the other hand, if the largest stable region were in phase with the system clock (e.g., in the above example, if the largest stable region contained values of 0b1001), no swapping would be necessary. It will be noted that these 4-bit status words are exemplary only; any number of variations falling within the scope of this application will be apparent to one of skill in the art.

After a delay setting is determined for the coupling, the logic may configure the second device to implement the determined delay setting. A signal transmitted on the coupling and received by the second device at the determined delay setting may be substantially aligned with the system clock. In other words, each input receiving a signal may receive the signal without metastability, e.g., signals received at a flip-flop may change before the flip-flop's setup time or after its hold time. That is to say, substantially aligned signals may be signals which are received without causing a setup violation or a hold violation.

In some embodiments, the method described above may be repeated for each coupling of a plurality of parallel couplings between the first device and the second device. For example, the method described above may be one part of a method for training a data path for parallel data transfer, which may also include a method for aligning a plurality of parallel signals, such as the one described below with respect to FIG. 3, according to various embodiments, or any other method for aligning a plurality of parallel signals.

Figure 3:
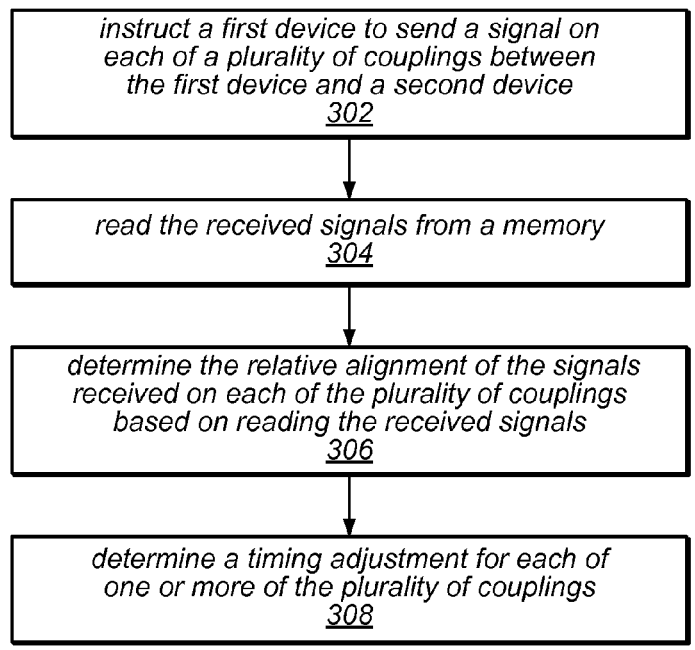
FIG. 3 is a flowchart diagram illustrating a method for aligning a plurality of parallel signals according to one embodiment.

FIG. 3—Method for Aligning a Plurality of Parallel Signals

FIG. 3 is a flowchart diagram illustrating a method for aligning a plurality of parallel signals according to one embodiment. The method may be performed by logic coupled to a first device and a second device, such as in the system described above with respect to FIG. 1 according to various embodiments, e.g., to ensure that the signals sent from the first device to the second device on the plurality of couplings between the first device and the second device are properly coordinated such that a word transmitted from the first device is faithfully reproduced at the second device. In some embodiments, the method may be performed in combination with a method for removing metastability in each coupling of the plurality of parallel couplings (such as described above with respect to FIG. 2, or any other method for removing metastability in the couplings) as part of a method for training a data path for parallel data transfer.

In 302, a first device may be instructed to send a signal on each of a plurality of couplings between the first device and a second device. Each signal may be an identical pattern; in some embodiments, the signal may be a sparse, repeating pattern. For example, in one exemplary pattern, the first device may transmit a 1, every sixth falling edge clock signal, and 0s at every other clock signal, on each coupling. The second device may receive and store the signals transmitted on each coupling. In one embodiment, the received data may be stored in a RAM (or other memory) as entire words. For a signal which is a repeating pattern, the data stored in the memory may correspondingly be a repeating set of words. Thus, for example, given the exemplary pattern described above, if each signal captured by the second device is in alignment with the other signals, the following repeating 6 word pattern might be stored:

0000ffff
00000000
00000000
00000000
00000000
00000000
0000ffff
00000000
etc.

In this notation, each hexadecimal value represents four bits. Thus, the rightmost value represents bits 0, 1, 2, and 3 (values 1+2+4+8=f in the first word); similarly, bits 4, 5, 6, and 7, etc. As can be seen, on every sixth falling edge each bit (e.g., the datum sent on each coupling) is 1, while all the other bits of the signal are 0s. Other notations and other patterns are also possible. It should also be noted that words of different numbers of bits (e.g., depending on the number of couplings) are also envisioned.

In 304, the received signals may be read from the memory. If the signals on the plurality of couplings are already in alignment, a word pattern indicating this (e.g., the word pattern shown above, in the case of the exemplary signal pattern described above) may be read from memory. However, if one or more of the signals are out of alignment with one another, a different pattern might be read from the memory. For example, an exemplary pattern indicating that not all of the signals are properly aligned with each other (in keeping with the transmitted pattern and the notation described above) might be the following word pattern:

00000010
00000104
0000feeb
00000000
00000000
00000000
00000010
00000104

In 306, the relative alignment of the signals received on each of the plurality of couplings may be determined based on reading the received signals. In other words, the logic may be configured to determine during which clock cycle data on each channel is being received, relative to each other data channel, based on the word pattern read from memory. Thus for example, in the exemplary case shown above, the majority of the signals are received in alignment, but the signal on the coupling which is read as bit 4 is received 2 clock cycles earlier than the majority of the signals, while the signals on the couplings read as bits 8 and 2 are received 1 clock cycle earlier than the majority of the signals. Because of the simplicity and sparcity of the signals and the word pattern they produce, this may be relatively simple for the logic to determine.

In 308, a timing adjustment for each of one or more of the plurality of couplings may be determined. If the signals are already in alignment, no timing adjustment for any of the couplings may be required. However, if a signal received on any of the plurality of couplings is out of alignment with the signals received on the rest of the plurality of couplings, a timing adjustment may be necessary for one or more of the couplings. The timing adjustment may be implemented in a variety of ways. In one embodiment, the signals may be aligned to the last clock cycle in which a signal is received; in this case, if the second word pattern shown above were received, the coupling on which bit 4 is received may be delayed by 2 clock cycles, the couplings on which bits 8 and 2 are received may be delayed by 1 clock cycle each, and the timing for the remainder of the couplings may not be adjusted. In an alternate embodiment, the couplings may be pre-delayed, such that if a signal is received on a given coupling after the majority of the other signals, the coupling may have part or all of the delay removed such that bits received on that coupling are received 1 or more clock cycles earlier. Other timing adjustment schemes are also possible.

After the timing adjustment for each of the one or more of the plurality of couplings is determined, those timing adjustments may be implemented on the second device. For example, the logic may configure the second device to implement the determined delay addition(s) and/or removal(s) on the determined couplings of the plurality of couplings. Thus, after the timing adjustment(s), a set of bits which is transmitted by the first device on the plurality of couplings in a single clock cycle may also be received by the second device in a single clock cycle. In other words, each word (i.e., set of bits) transmitted by the first device may be faithfully received by the second device.

The method described above may serve to align the falling edge bits transmitted between the first device and the second device. In some embodiments, it may also be desirable to align the rising edge bits transmitted between the first device and the second device. In this case, a similar set of method steps may be performed as described above, but with a data pattern configured to align the bits transmitted on rising edge clock signals. For example, where the exemplary signal pattern described above includes transmitting a 1 on every sixth falling edge clock signal, and 0s at every other clock signal, on each coupling, a complementary signal pattern which could be used to align the bits transmitted on rising edge clock signals might include transmitting a 1 during every sixth rising edge clock signal, and transmitting 0s during the remaining clock signals. Such a signal pattern might produce the following word pattern if each rising edge signal captured by the second device is in alignment with the other rising edge signals:

ffff0000
00000000
00000000
00000000
00000000
00000000
ffff0000
00000000

In addition, it may be also desirable to ensure that the timing adjustment(s) for the falling- and rising-edge data are aligned; for example, if the falling edge bits and the rising edge bits are separately aligned, as described above, it is possible that the falling edge data may be delayed differently than the rising edge data. Thus, a similar set of method steps may again be performed with a data pattern configured to ensure that the bits transmitted on the rising edge clock signals are received in concert with the bits transmitted on the falling edge clock signals in such a way as to produce coherent data. One example of such a data pattern, might include transmitting a 1 every sixth rising and falling edge clock signal, and transmitting 0s during the remaining clock signals. If the rising edge data and falling edge data are not aligned with each other, but are aligned within themselves, such a data pattern might produce the following word pattern, or a similar word pattern:

0000ffff
ffff0000
00000000
00000000
00000000
00000000
0000ffff
ffff0000

In this case, the logic might make an additional timing adjustment, to align the falling edge data with the rising edge data. For example, the logic might instruct the second device to delay reception of the falling edge data by one clock cycle. In such a case, the aligned word pattern after the final timing adjustment might be as follows:

```
00000000
ffffffff
00000000
00000000
00000000
00000000
00000000
ffffffff
```

Alternatively, the timing adjustment might include removing one clock cycle of delay from reception of the rising edge data, or a different timing adjustment. In addition, it should be noted that if the falling and rising edge data are already in alignment, there may be no need for this additional timing adjustment.

After both falling edge and rising edge bits have been aligned and are in concert with each other, the data interface may be trained and ready for actual data; in other words, the parallel communication bus between the first device and the second device may be configured to transmit stable and aligned data from the first device to the second device.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for training a data path, comprising:
   instructing a first device to send a plurality of first training signals to a second device via a corresponding plurality of data lines between the first device and the second device, wherein each first training signal of the plurality of first training signals comprises a specified bit pattern that is equal to a corresponding clock signal of a system clock during transmission of that bit pattern by the first device;
   instructing the second device to perform:
      for each first training signal:
         for each delay setting of a plurality of delay settings:
            delaying reception of the first training signal by the delay setting, thereby generating a delayed first training signal;
            capturing signal state of the delayed first training signal via first and second flip-flops over a specified period of time, comprising:
               the first flip-flop capturing the signal state of the delayed first training signal on each rising edge of the system clock; and
               the second flip-flop capturing the signal state of the delayed first training signal on each falling edge of the system clock;
            wherein said capturing signal state accumulates in memory a characterization of the delayed first training signal indicating:
               whether a 1 was received at the first flip-flop over the specified period of time;
               whether a 0 was received at the first flip-flop over the specified period of time;
               whether a 1 was received at the second flip-flop over the specified period of time; and
               whether a 0 was received at the second flip-flop over the specified period of time;
            wherein the characterization indicates whether the delayed first training signal was received accurately over the specified period of time;
         analyzing the respective characterizations of the delayed first training signals;
         and
         selecting a delay setting of the plurality of delay settings for the data line of the first training signal based on the respective characterizations, wherein said selecting selects the delay setting that most substantially aligns the specified bit pattern with the clock signals of the system clock thereby removing metastability on the data line, wherein a subsequent signal transmitted on the at least one data line and received by the second device at the selected delay setting will be substantially aligned with the system clock either in phase or in an opposite phase of a clock cycle of the system clock.

2. The method of claim 1, further comprising:
   instructing the second device to perform:
      for each delayed first training signal:
         determining whether the delayed first training signal is in an opposite phase of a clock cycle of the system clock, based on the respective characterization of the delayed first training signal; and
         if the delayed first training signal is determined to be in the opposite phase, swapping outputs of the first and second flip-flops, thereby ensuring that bits transmitted on rising edges of the system clock are interpreted as being received on rising edges of the system clock, and that bits transmitted on falling edges of the system clock are interpreted as being received on falling edges of the system clock.

3. The method of claim 1, wherein the subsequent signal received by the second device at the selected delay setting is substantially aligned with the system clock and in the same phase of a clock cycle of the system clock relative to a clock cycle of the system clock at which the signal is sent by the first device.

4. The method of claim 1, wherein the selected delay setting is less than a clock cycle of the system clock.

5. The method of claim 1, the method further comprising:
   instructing the first device to send a plurality of second training signals on the corresponding plurality of data lines between the first device and the second device, wherein each second training signal comprises an identical multi-clock cycle bit pattern that is different from the clock signals of the system clock; and
   instructing the second device to perform:
      determining and storing a characterization of the second training signals that indicates
      relative alignment or misalignment of the second training signals received on each of the plurality of data lines; and
      for each second training signal that is relatively misaligned, determining a timing adjustment for the corresponding data line, thereby ensuring that the subsequent signals are received by the second device in the same clock cycle.

6. The method of claim 5, wherein the second device stores the characterization of the second training signals in memory according to the clock signal during which the second training signals are received.

7. The method of claim 5, wherein the timing adjustment for the corresponding data line comprises a respective delay at which signals on data line are received by the second device.

8. The method of claim 7, wherein each respective delay is an integer multiple of a clock cycle of the system clock.

9. A system, comprising:
   logic, coupled to a first device and a second device, wherein the logic is configured to:

instruct the first device to send a plurality of first training signals to a second device via a corresponding plurality of data lines between the first device and the second device, wherein each first training signal of the plurality of first training signals comprises a specified bit pattern that is equal to a corresponding clock signal of a system clock during transmission of that bit pattern by the first device;
instruct the second device to:
for each first training signal:
for each delay setting of a plurality of delay settings:
delay reception of the first training signal by the delay setting, thereby generating a delayed first training signal;
capture signal state of the delayed first training signal via first and second flip-flops over a specified period of time, comprising:
the first flip-flop capturing the signal state of the delayed first training signal on each rising edge of the system clock; and
the second flip-flop capturing the signal state of the delayed first training signal on each falling edge of the system clock;
wherein said capturing signal state accumulates in memory a characterization of the delayed first training signal indicating:
whether a 1 was received at the first flip-flop over the specified period of time;
whether a 0 was received at the first flip-flop over the specified period of time;
whether a 1 was received at the second flip-flop over the specified period of time; and
whether a 0 was received at the second flip-flop over the specified period of time;
wherein the characterization indicates whether the delayed first training signal was received accurately over the specified period of time;
analyze the respective characterizations of the delayed first training signals;
and;
select a delay setting of the plurality of delay settings for the data line of the first training signal based on the respective characterizations, wherein the delay setting that most substantially aligns the specified bit pattern with the clock signals of the system clock is selected thereby removing metastability on the data line, wherein a subsequent signal transmitted on the data line and received by the second device at the selected delay setting will be substantially aligned with the system clock either in phase or in an opposite phase of a clock cycle of the system clock.

10. The system of claim 9, wherein the logic is further configured to:
instruct the first device to send a plurality of second training signals on the corresponding plurality of data lines, wherein each second training signal is an identical multi-clock cycle bit pattern that is different from the clock signals of the system clock; and
instruct the second device to:
determine and store a characterization of the second training signals that indicates relative alignment of the second training signals received on each of the plurality of data lines; and
for each second training signal that is relatively misaligned, determine a timing adjustment thereby ensuring that the subsequent training signals are received by the second device in the same clock cycle.

11. A non-transitory computer readable memory medium storing program instructions for training a data path, wherein the program instructions are executable to:
instruct the first device to send a plurality of first training signals to a second device via a a corresponding plurality of data lines between the first device and the second device, wherein each first training signal of the plurality of first training signals comprises a specified bit pattern that is equal to a corresponding clock signal of a system clock during transmission of that bit pattern by the first device;
instruct the second device to:
for each first training signal:
for each delay setting of a plurality of delay settings:
delay reception of the first training signal by the delay setting, thereby generating a delayed first training signal;
capture signal state of the delayed first training signal via first and second flip-flops over a specified period of time, comprising:
the first flip-flop capturing the signal state of the delayed first training signal on each rising edge of the system clock; and
the second flip-flop capturing the signal state of the delayed first training signal on each falling edge of the system clock;
wherein said capturing signal state accumulates in memory a characterization of the delayed first training signal indicating:
whether a 1 was received at the first flip-flop over the specified period of time;
whether a 0 was received at the first flip-flop over the specified period of time;
whether a 1 was received at the second flip-flop over the specified period of time; and
whether a 0 was received at the second flip-flop over the specified period of time;
wherein the characterization indicates whether the delayed first training signal was received accurately over the specified period of time;
analyze the respective characterizations of the delayed first training signals;
and;
select a delay setting of the plurality of delay settings for the data line of the first training signal based on the respective characterizations, wherein the delay setting that most substantially aligns the specified bit pattern with the clock signals of the system clock is selected, thereby removing metastability on the data line, wherein a subsequent signal transmitted on the data line and received by the second device at the selected delay setting will be substantially aligned with the system clock either in phase or in an opposite phase of a clock cycle of the system clock.

12. The non-transitory computer readable memory medium of claim 11, wherein the program instructions are further executable to:
instruct the first device to send a plurality of second training signals on the corresponding plurality of data lines, wherein each second training signal is an identical multi-clock cycle bit pattern that is different from the clock signals of the system clock; and
instruct the second device to:
determine and store a characterization of the second training signals that indicates relative alignment of the second training signals received on each of the plurality of data lines; and for each training signal that is relatively misaligned, determine a timing adjustment thereby ensuring that the subsequent training signals are received by the second device in the same clock cycle.

* * * * *